United States Patent
Wiik

(10) Patent No.: US 9,707,922 B2
(45) Date of Patent: Jul. 18, 2017

(54) AIRBAG MODULE

(71) Applicant: TK HOLDINGS INC., Auburn Hills, MI (US)

(72) Inventor: Richard Andrew Wiik, Oakland, MI (US)

(73) Assignee: TK HOLDINGS INC., Auburn Hills, MI (US)

( * ) Notice: Subject to any disclaimer, the term of this patent is extended or adjusted under 35 U.S.C. 154(b) by 0 days.

(21) Appl. No.: 14/964,230

(22) Filed: Dec. 9, 2015

(65) Prior Publication Data

US 2016/0167616 A1    Jun. 16, 2016

Related U.S. Application Data

(60) Provisional application No. 62/090,128, filed on Dec. 10, 2014.

(51) Int. Cl.
*B60R 21/231* (2011.01)
*B60R 21/207* (2006.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC ............ B60R 21/23138; B60R 21/276; B60R 21/2346; B60R 21/239; B60R 21/207;
(Continued)

(56) References Cited

U.S. PATENT DOCUMENTS

| | | | |
|---|---|---|---|
| 5,190,313 A * | 3/1993 | Hickling | B60R 21/233 244/121 |
| 2003/0168836 A1* | 9/2003 | Sato | B60R 21/235 280/730.2 |

(Continued)

FOREIGN PATENT DOCUMENTS

| | | |
|---|---|---|
| DE | 10 2011 084 093 A1 | 4/2012 |
| DE | 10 2012 216 896 A1 | 3/2013 |

(Continued)

OTHER PUBLICATIONS

International Search Report mailed Mar. 25, 2016 issued in PCT/US2015/064797.

(Continued)

*Primary Examiner* — Darlene P Condra
(74) *Attorney, Agent, or Firm* — Gordon & Rees LLP

(57) ABSTRACT

An airbag module for protecting an occupant of a vehicle seat. The module includes an inflatable cushion and an inflator for providing inflation gas for the cushion. The cushion includes at least a first inflatable chamber and a second inflatable chamber. The inflatable cushion is configured so that the first inflatable chamber fully inflates prior to the second inflatable chamber becoming fully inflated. The second inflatable chamber is positioned to absorb energy resulting from movement of the head of the occupant, and the loft of the second inflatable chamber is greater than the loft of the first inflatable chamber.

15 Claims, 8 Drawing Sheets

(51) Int. Cl.
*B60R 21/233* (2006.01)
*B60R 21/2346* (2011.01)
*B60R 21/239* (2006.01)
*B60R 21/276* (2006.01)

(52) U.S. Cl.
CPC ........ *B60R 21/239* (2013.01); *B60R 21/2346* (2013.01); *B60R 21/276* (2013.01); *B60R 2021/23146* (2013.01); *B60R 2021/23308* (2013.01)

(58) Field of Classification Search
CPC ........ B60R 21/233; B60R 2021/23308; B60R 2021/23146
See application file for complete search history.

(56) References Cited

U.S. PATENT DOCUMENTS

| | | | |
|---|---|---|---|
| 2004/0124615 A1* | 7/2004 | Tanase | B60R 21/207 280/730.2 |
| 2005/0062266 A1 | 3/2005 | Steimke et al. | |
| 2006/0071458 A1* | 4/2006 | Sendelbach | B60R 21/23138 280/729 |
| 2006/0131847 A1 | 6/2006 | Sato et al. | |
| 2006/0217016 A1* | 9/2006 | Lin | B60R 21/235 442/59 |
| 2006/0255572 A1* | 11/2006 | Svenbrandt | B60R 21/207 280/730.2 |
| 2007/0013174 A1 | 1/2007 | Riedel et al. | |
| 2009/0160171 A1* | 6/2009 | Nam | B60R 21/233 280/743.2 |
| 2009/0230659 A1* | 9/2009 | Megiveron | B60R 21/0136 280/728.3 |
| 2011/0001307 A1 | 1/2011 | Mendez | |
| 2011/0049852 A1 | 3/2011 | Kibat et al. | |
| 2012/0091697 A1 | 4/2012 | Wiik et al. | |
| 2013/0076014 A1 | 3/2013 | Thomas et al. | |
| 2013/0200664 A1* | 8/2013 | Patterson | B60R 21/207 297/216.1 |
| 2013/0328294 A1 | 12/2013 | Fukawatase et al. | |
| 2014/0062069 A1 | 3/2014 | Fukawatase | |
| 2015/0054265 A1* | 2/2015 | Deng | B60R 21/232 280/730.2 |

FOREIGN PATENT DOCUMENTS

| | | |
|---|---|---|
| EP | 1 393 997 A1 | 3/2004 |
| EP | 1 832 475 A1 | 9/2007 |
| GB | 2 299 061 A | 9/1996 |
| WO | WO 01/49535 A1 | 7/2001 |
| WO | WO 2010/108590 A1 | 9/2010 |
| WO | WO 2012/117561 A1 | 9/2012 |

OTHER PUBLICATIONS

Written Opinion mailed Mar. 25, 2016 issued in PCT/US2015/064797.

* cited by examiner

AIRBAG MODULE

CROSS-REFERENCE TO RELATED APPLICATIONS

The present application claims priority to and the benefit of U.S. Provisional Patent Application No. 62/090,128, filed Dec. 10, 2014. The foregoing provisional application is incorporated by reference herein in its entirety.

BACKGROUND

The present application relates generally to the field of airbags and occupant protection systems. More specifically, the application relates to an airbag module that includes an airbag, such as a center side impact airbag (CSIAB).

An airbag module may be provided in a vehicle seat, such as one of the front seats of the vehicle. In particular, a CSIAB is configured to deploy away from the seat to dampen the energy associated with the displacement of the occupant in the inboard direction in the event of a vehicle side impact and to transfer the load of the occupant to the seat frame. The center side impact airbag is also referred to as a far side airbag. An outboard mounted side airbag is also referred to as a near side airbag.

Current side impact airbags have a very fast deployment time to account for the abbreviated distance between the occupant and the impacting vehicle. Outboard mounted side airbags are positioned between the occupant and intruding structure and must inflate and deploy into position within approximately 8-25 milliseconds after crash sensing. Side airbags mounted on the inboard side of the seat must deploy into a position to provide lateral torso restraint when a far side occupant begins to move relative to the seat and begin contacting into the cushion. This relative movement or translation generally begins to occur approximately 40 milliseconds after the crash is detected or sensed. Most conventional side airbag cushions are configured with one larger or primary chamber and inflate to substantially one pressure level, with minimal degradation in pressure over time.

SUMMARY

According to a disclosed embodiment, an airbag module for protecting an occupant of a vehicle seat is provided. The module includes an inflatable cushion and an inflator for providing inflation gas for the cushion. The cushion includes a first inflatable chamber fluidly connected to a forward inflatable chamber. The cushion is configured to inflate into a position in which the first inflatable chamber is in a position to absorb energy resulting from relative movement of the occupant in a direction lateral to the longitudinal axis of the vehicle. The forward chamber is configured to inflate into a position to absorb energy resulting from relative movement of the occupant in a forward direction of the vehicle.

According to another disclosed embodiment, an airbag module for protecting an occupant of a vehicle seat is provided. The module includes an inflatable cushion and an inflator for providing inflation gas for the cushion. The cushion includes at least a first inflatable chamber and a forward inflatable chamber. The cushion is configured to bend along a boundary between the first inflatable chamber and the forward inflatable chamber so that the forward inflatable chamber is positioned to absorb energy resulting from relative movement of the occupant in a forward direction of the vehicle.

According to yet another disclosed embodiment, an airbag module for protecting an occupant of a vehicle seat is provided. The module includes an inflatable cushion and an inflator for providing inflation gas for the cushion. The cushion includes at least a first inflatable chamber and a second inflatable chamber. The cushion is configured so that the first inflatable chamber fully inflates prior to the second inflatable chamber becoming fully inflated. The second inflatable chamber is positioned to absorb energy resulting from movement of the head of the occupant. The loft of the second inflatable chamber is greater than the loft of the first inflatable chamber.

It is to be understood that both the foregoing general description and the following detailed description are exemplary and explanatory only, and are not restrictive of the invention as claimed.

DETAILED DESCRIPTION

Various features of the airbag module will be described with reference to the drawings. Like numbers are used throughout the drawings to refer to the same or similar parts and in each of the embodiments of the invention hereafter described.

Cushions that deploy into an inboard position between two occupants of a vehicle also may have a secondary restraint mode, in which the cushions provide cushioning of the occupants relative to each other. This secondary restraint mode is primarily focused on restraining the head of the occupant. The timing of this secondary event is typically between approximately 80 and 130 milliseconds after crash sensing.

Generally, side impact airbags provide restraint in a purely lateral direction (i.e., a direction generally perpendicular to the longitudinal or fore and aft direction of the vehicle). However, it may be desirable to provide restraint in a non-lateral direction in the event a side impact includes a non-lateral component of force. For simplicity, a side impact airbag or cushion may be described as being generally two dimensional in shape. The lateral thickness of the cushion is typically controlled by an internal zero length tether (e.g., a seam or connection between two panels of the airbag) or a tether of prescribed length to create a prescribed thickness and/or to manage volume. The improved side impact airbags described herein are configured to provide restraint in the non-primary impact direction, by providing a reaction surface in a non-lateral direction and, in some cases, in a direction substantially perpendicular to the primary lateral impact direction.

Frontal impacts frequently have a lateral force component that occurs at some point in time during the duration of the impact or crash. In the case of a frontal oblique impact, the occupant may travel in a direction towards the impact and the occupant travels somewhat laterally, and not entirely directly into the frontal restraints. In this situation, it may be desirable to re-direct or guide the occupant back towards the classic frontal restraints using a side mounted or side impact airbag.

Figure 1:
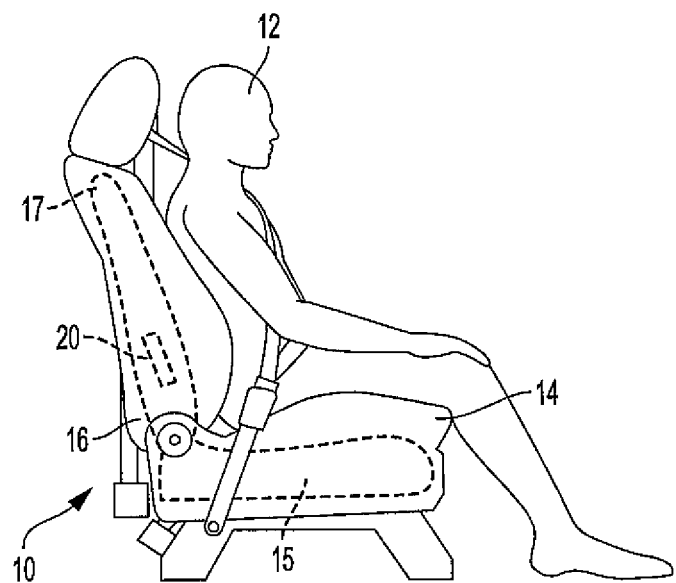
FIG. 1 is a schematic side view of a vehicle seat including a center side impact airbag module.

A vehicle seat 10 for a vehicle with an occupant 12 is shown in FIG. 1. The vehicle seat 10 includes a generally horizontal lower portion or seat bottom 14 with a seat bottom frame 15 and an upper portion or seat back 16 with a seat back frame 17. The seat bottom 14 is coupled to the vehicle and the seat back 16 extends upward from the rear end of the seat bottom 14. The seat back 16 may be connected to the seat bottom 14 through a recliner mechanism that allows the seat back 16 to tilt or pivot relative to the seat bottom 14. Each of the seat bottom 14 and the seat back 16 include a cushion such as a foam pad that is coupled to the frame, and a trim cover that surrounds the cushion.

The vehicle seat 10 includes a center side impact airbag (CSIAB) module 20 located in the seat back 16 along the inboard side of the vehicle seat 10. The CSIAB module 20 is configured to deploy an airbag in order to absorb energy and limit the cross-car (e.g., lateral, side-to-side) movement of the occupant 12 in a side impact event (e.g., a crash occurring at an opposite side of the vehicle, i.e., a far side). While the CSIAB module 20 is generally shown as being configured for a driver side passenger, the CSIAB module 20 is applicable to both driver side and passenger side configurations. The CSIAB module 20 may be used to provide protection to any occupant located in any seating row (e.g., first, second, third) of a vehicle.

Figure 2:
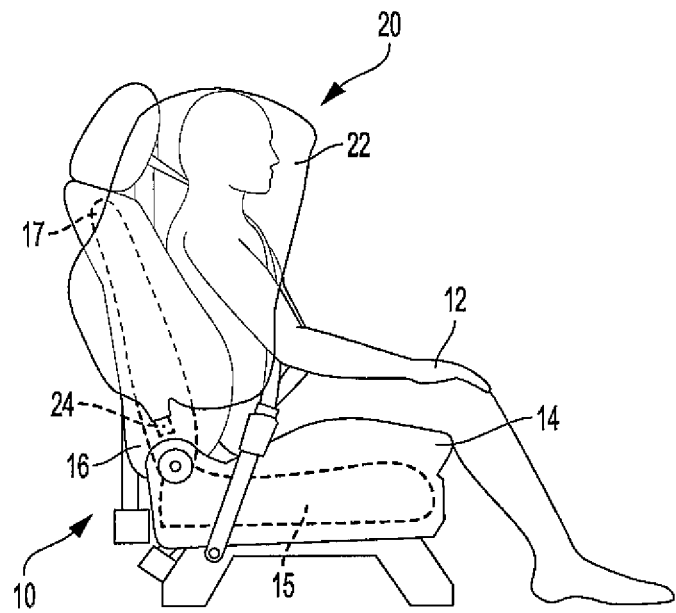
FIG. 2 is a schematic side view of a vehicle seat showing the center side impact airbag deployed.

As shown in FIG. 2, the CSIAB module 20 includes an airbag or cushion 22 and an inflator 24. The inflator 24 may be a pyrotechnic device, or other airbag inflation device that is configured to generate gas at a high volumetric flow rate for the inflatable cushion 22. The CSIAB module 20 may be provided within the seat back 16, under the trim cover. The CSIAB module 20 is coupled to the seat back frame 17 with a mounting device. In a side impact, the inflation gas provide by the inflator 24 fills the cushion 22, expanding the cushion 22 to deploy from the side bolster of the seat back 16 to a position along the side of the upper body of the occupant 12 of the vehicle seat 10. The airbag cushion 22 deploys in a position generally in the center of the vehicle and alongside another seat in the same row, as well as the passenger seated therein.

The cushion 22 may be formed from a first panel (e.g., inboard panel, inner panel, front panel, etc.) and a second panel (e.g., outboard panel, outer panel, rear panel, etc.) that are coupled together by a plurality of sewn seams. According to an exemplary embodiment, the first panel and the second panel are a nylon fabric. In other embodiments, the cushion 22 may be formed from any suitable fabric material. The panels may be sewn together or secured by other suitable methods such as thermobonding or welding. The panels and the connecting seams may be coated with a sealant in order to reduce the leakage of inflation gas. The cushion 22 may be divided into two or more compartments (e.g., chambers, tubes, etc.). Passages or ports may be provided between individual compartments such that the compartments are in fluid communication with each other. The cushion 22 may also include a plurality of un-inflated portions such as un-inflated portions that generally separate the compartments.

Figure 3:
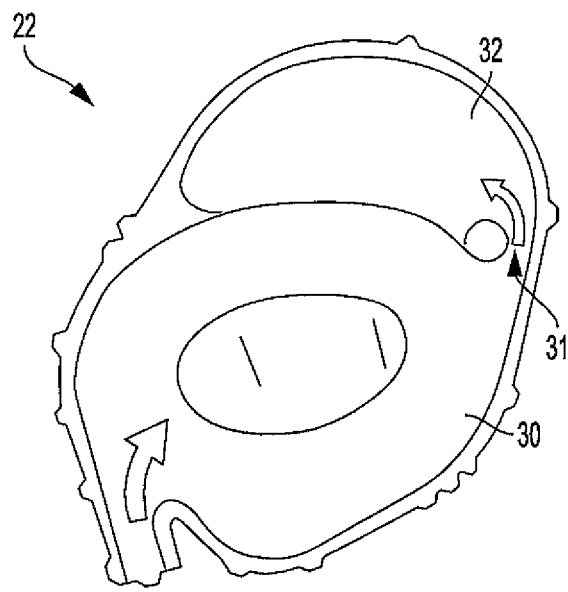
FIG. 3 is a front view of the airbag cushion of the module of FIG. 2 in an uninflated configuration.
Figure 4:
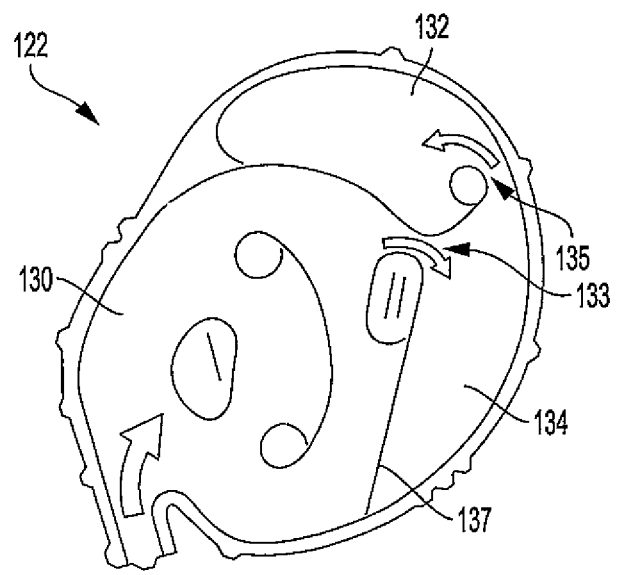
FIG. 4 is a front view of an airbag cushion of an airbag module in a flattened, uninflated configuration, according to another exemplary embodiment.
Figure 5:
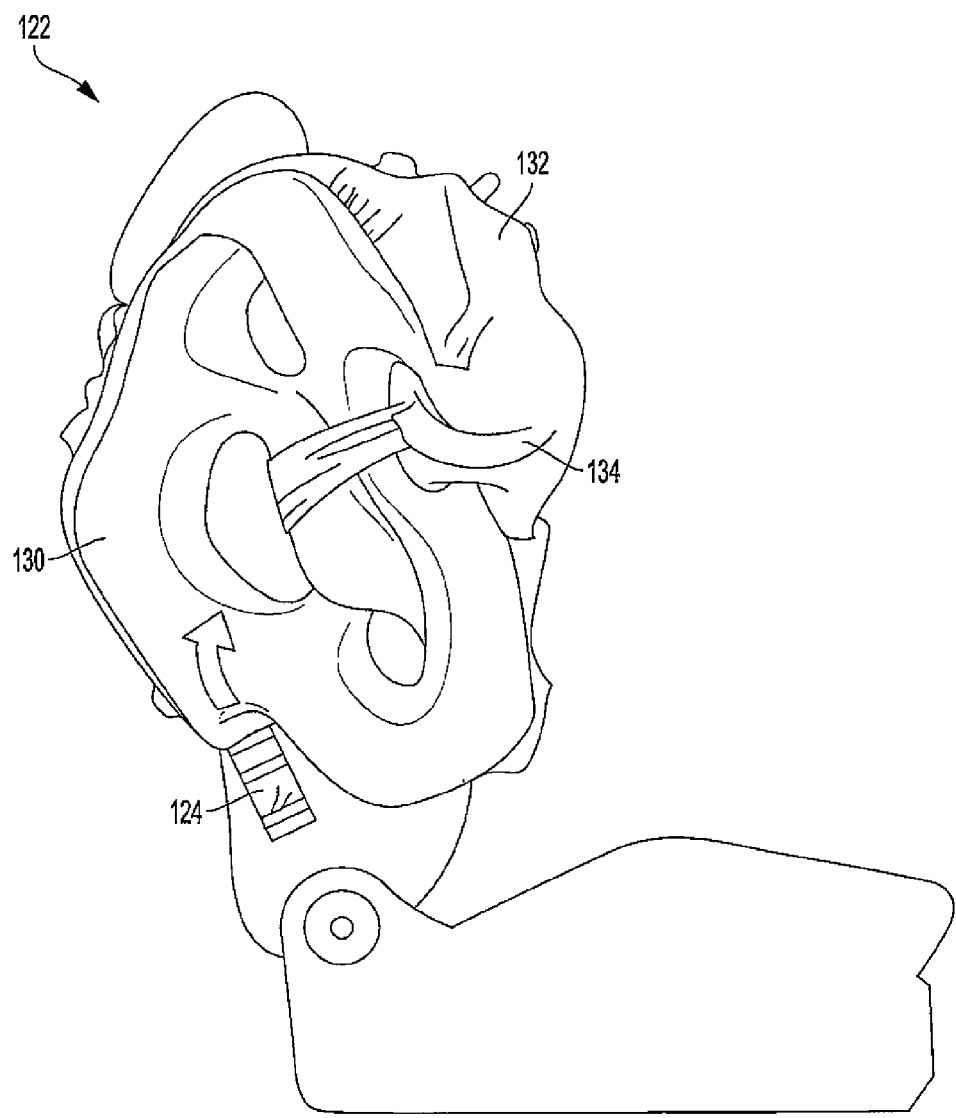
FIG. 5 is a side view of a vehicle seat with the airbag cushion of FIG. 4 in a first stage of inflation.

In FIG. 3, the airbag cushion 22 is shown in an uninflated configuration, detached from the seat back frame 17. The airbag cushion 22 includes a first or main chamber 30 and a second chamber 32 disposed generally above the first chamber 30 and in fluid communication with the first chamber 30 via a relatively narrow passage 31 (e.g., orifice, control opening, vent, etc.).

When the airbag cushion 22 is deployed, inflation gasses from the inflator 24 initially fills the first chamber 30 fairly quickly after impact (e.g., approximately 15-20 ms after ignition of the inflator 24). The first chamber 30 is positioned to be contacted by the torso/shoulder of the occupant. The first chamber 30 forms a high pressure, rigid structure that is configured to provide lateral restraint and to resist bending. Because the first chamber 30 is smaller in volume than the total volume of the airbag cushion 22, the first chamber 30 is able to rapidly inflate to provide fast in position timing and an early higher pressure to begin to restrain the occupant from moving laterally. Due to the constriction of the narrow passage 31, gas flow to the second chamber 32 is restricted, helping maintain the higher initial pressure of the primary chamber 30 over a longer duration, improving bending resistance and lateral restraint.

The airbag cushion 22 is configured so that inflation gasses pass from the first chamber 30 through the passage 31 to inflate the second chamber 32 later in the impact event (e.g., approximately 50-90 ms after ignition of the inflator 24). While only a single passage 31 is shown in FIG. 3, in other embodiments the cushion 22 may include multiple passages providing a torturous or restricted path or through which the inflation gas must pass to enter the second chamber 32. The second chamber 32 is positioned to be contacted by the head of the occupant. While the first chamber 30 has a higher pressure to restrain the occupant, the second chamber 32 is configured to have a relatively high loft (e.g., large thickness and a lower pressure than the first chamber 30) to provide improved head cushioning when the head contacts the airbag cushion 22 during the impact event, reducing occupant head rebound.

By providing separate chambers 30 and 32 with different physical dimensions and inflation pressures, the airbag cushion 22 is able to provide improved cushioning and lateral restraint in an impact event compared to a typical airbag cushion having a single chamber or multiple chambers inflating at approximately the same time.

The embodiments disclosed herein are generally directed to far side airbags. Far side airbags have different functional characteristics than near side airbags. A near side airbag deploys between the side of the vehicle and the occupant.

The near side airbag is located outboard the occupant. A near side airbag is configured to provide cushioning for the occupant in a side impact invention such as, for example, a collision involving an intrusion of a structure into the passenger compartment of a vehicle. A near side airbag is configured to provide cushioning to the occupant in a side crash situation. A far side airbag is typically configured to provide an additional feature and restrain the lateral movement of the occupant.

The need for the far side airbag to provide lateral restraint results from the lack of reaction surfaces in the center of the vehicle between the seats. The outboard side of the passenger compartment can function as a reaction surface for the occupant and near side airbag. However, in the center of the vehicle there is typically no reaction surface available. In certain vehicles, the center console may provide a limited reaction surface, but the center console is not sufficient to restrain the occupant. As a result, certain embodiments of the far side airbag disclosed herein provide a high pressure region in a portion of the airbag that is positioned to restrain the torso region of the occupant and resist bending.

Certain near side airbags include chambers having different pressures. A near side airbag may typically have a thorax protecting portion configured to inflate to a relatively low pressure. The thorax protecting portion is configured to reduce loading resulting from any intrusion on the thorax region of the occupant. A near side airbag may also include a portion configured to protect the head region of the occupant. The head protecting portion of the airbag may be configured to inflate to a medium pressure greater than the thorax protecting portion. A near side or outboard inflating airbag may include torso (pelvis and thorax) protecting portions. In one embodiment, the pelvis portion may inflate to a higher pressure and vent into the thorax portion. The pelvis/thorax near side airbag may also include external vents to allow the airbag to deflate quickly because the intrusion event is over relatively quickly. Also, the near side or outboard side airbag is not configured to provide prolonged restraint of the occupant. Thus, the inflation air may be quickly vented from the airbag. Other embodiments of the near side or outboard inflating airbag may include both thorax and head protecting portions. Typically, the thorax/head protecting outboard or near side airbag is a single chamber airbag but can include multiple chambers.

The far side airbags disclosed herein include a torso (thorax and possibly pelvis) protecting region. The torso region is configured to inflate to a relative high pressure because, as explained above, the far side airbag disclosed herein is configured to resist bending when loaded by the occupant. In addition, the embodiments of the far side airbag disclosed herein are configured to remain inflated for a longer duration than the near side airbags, because of the need for the far side airbag to restrain the occupant against lateral movement. The disclosed far side airbags also typically include a higher loft head protecting portion, which has a relatively lower pressure than the torso protecting portion. For example, when the head protecting portion becomes fully inflated the pressure in the head chamber is approximately one half (or less) than the pressure of the torso protecting region. The far side airbags disclosed herein include at least two chambers to protect the head and torso regions. The pressure in each region can be configured to be different from the other chambers of the airbag. Conventional far side airbags only include a single chamber having a uniform pressure.

As referenced herein, the various low, medium and high pressures correlate to numerical ranges. For example, low pressure corresponds to airbag internal pressures of up to 60 kPa. Medium pressure corresponds to an airbag internal pressure of 50-100 kPa. High pressure corresponds to a pressure greater than 100 kPa. Preferably, high pressure is equal to or greater than 150 kPa.

As mentioned above, near side cushions inflate quickly and also deflate or exhaust rather quickly, typically through the provision of vent openings. A near side airbag is typically fully inflated 10 ms after the crash is detected. In a side crash situation, the occupant has typically contacted and fully loaded the airbag and begins to move away from the airbag about 40-50 ms after the crash is detected. The near side airbag is typically full exhausted soon after the occupant rebounds off the airbag. The fully inflated condition of airbag or airbag chamber occurs at or shortly after (e.g., 5 ms or less) the point in time when the exterior panel of the airbag or airbag chamber assumes a wrinkle free condition.

In a conventional single chamber far side airbag, the airbag is fully inflated by approximately before 40 ms after the crash is detected, when occupant translation in the seat begins. However, in the embodiments disclosed herein, a far side airbag is disclosed with at least one chamber that is inflated on a delayed basis. In the disclosed embodiments, the main chamber protecting the torso is preferably in position and fully inflated by approximately 15 ms. The second chamber, which inflates later and is positioned, for example, for protecting the head, begins filling at approximately 20 ms and is completely inflated by approximately 60 ms. After the last delayed chamber is fully inflated, the pressure between the two or more chambers begins to equalize. The disclosed embodiments are configured with a delayed inflation of at least one chamber because the duration of a far side event resulting from a side crash is longer than a near side event for a given side crash. In a far side event, the far side occupant begins moving relative to the seat at approximately 40 ms. The potential for occupant to occupant interaction occurs at approximately 70-100 ms and the full excursion of the occupant occurs by approximately 160 ms.

The far side airbags disclosed herein are configured with a recognition of the differences between near side and far side events related to a side crash. For example, the disclosed far side airbag is configured to maintain airbag pressure for a longer duration, which as explained above is greater than 40 ms (e.g., in the range of approximately 40-160 ms, for example 120 ms or greater). The far side airbag is typically formed by coated fabric and may include sealed seams to reduce or minimize leakage of inflation gas outside the airbag. In addition, the far side airbag disclosed herein preferably does not reach equilibrium pressure between the two or more chambers until at least 60 ms after the crash event is detected. The airbag will preferably remain inflated for an additional time period after an equilibrium pressure is reached such as, for example, at least 200 ms after sensing the crash, but in certain embodiments the airbag may remain inflated for longer time period to provide protection to the occupant in the event of secondary impacts involving the vehicle or vehicle rollover events.

FIGS. 4-9C shown an airbag module and cushion according to another exemplary embodiment. The airbag cushion 122 includes a first or main chamber 130, a second chamber 132 disposed generally above the first chamber 130, and a third or forward chamber 134 (e.g., a pivot chamber, etc.) disposed generally forward of the first chamber 130. The forward chamber 134 is in fluid communication with the first chamber via a relatively narrow passage 133. The second chamber 132 is in fluid communication with the forward chamber 134 via a relatively narrow passage 135. Through the passages 133 and 135, the second chamber 132 and the forward chamber 134 are effectively arranged in series with the first chamber 130.

When the airbag cushion 122 is deployed, inflation gasses from the inflator 124 initially fills the first chamber 130 fairly quickly after impact (e.g., approximately 15-20 ms after ignition of the inflator 124). The first chamber 130 is positioned to be contacted by the torso of the occupant. The first chamber 130 forms a high pressure, rigid structure that resists bending and provides lateral restraint.

Figure 6A:
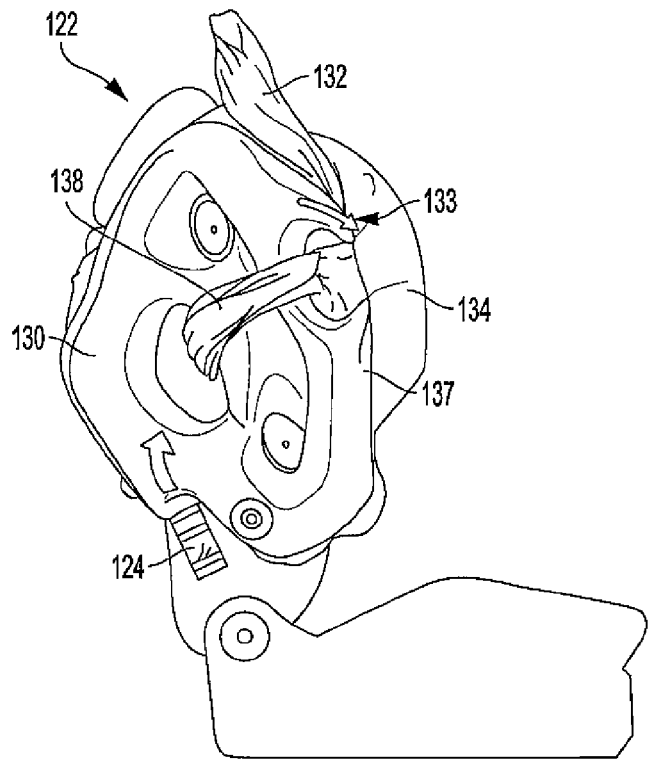
FIG. 6A is a side view of a vehicle seat with the airbag cushion of FIG. 4 in a second stage of inflation.
Figure 6B:
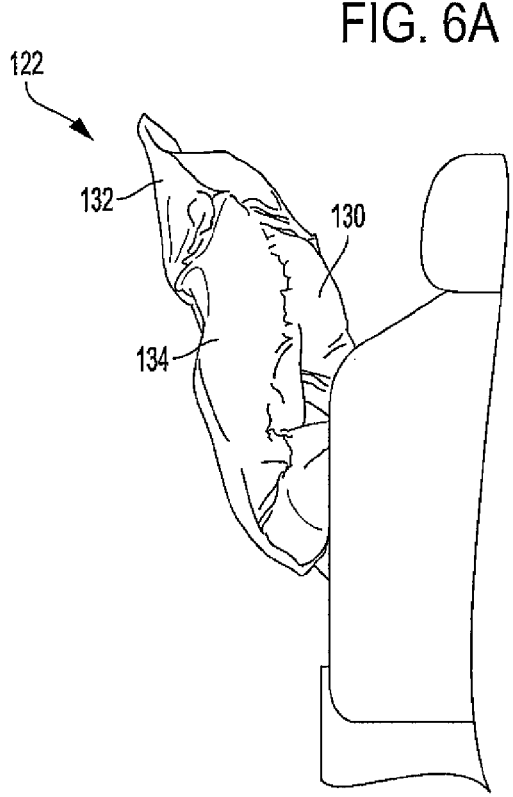
FIG. 6B is a top view of a vehicle seat with the airbag cushion of FIG. 4 in a second stage of inflation.
Figure 7:
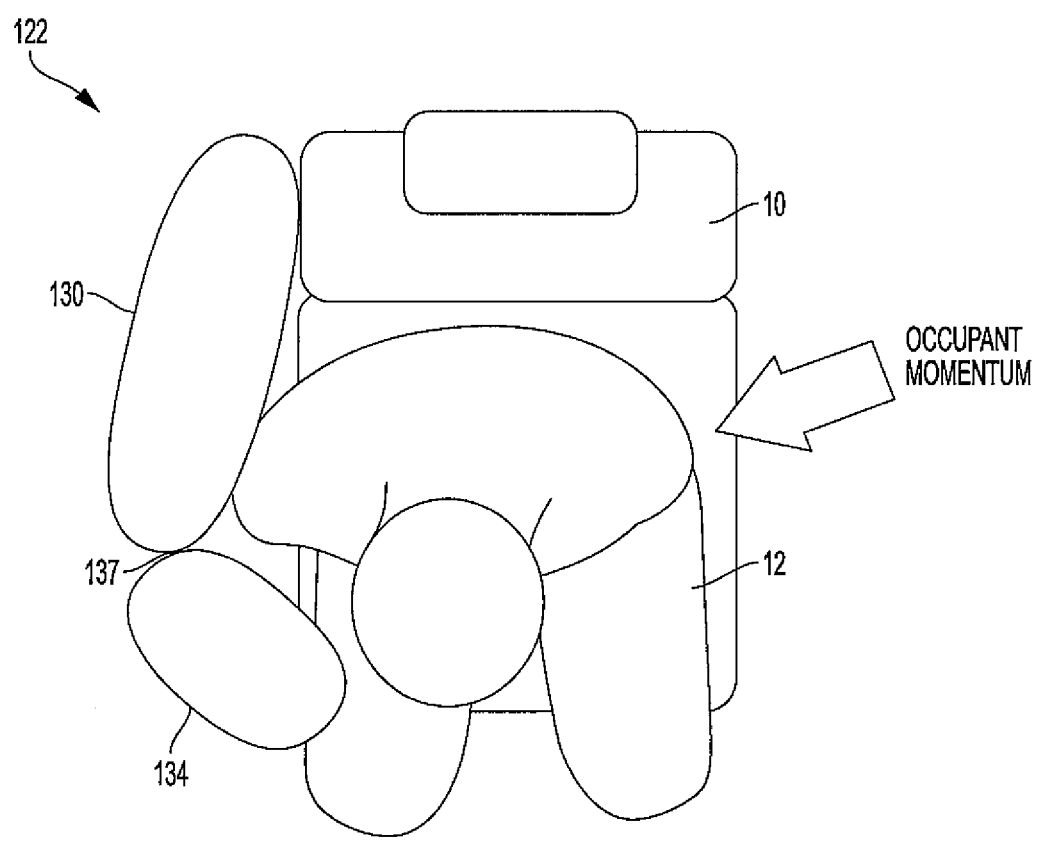
FIG. 7 is a schematic top view of an occupant contacting the airbag cushion of FIG. 4.

As shown in FIGS. 6A and 6B, the inflation gasses pass through the passage 133 to inflate the forward chamber 134 later in the impact event (e.g., approximately 25-30 ms after ignition of the inflator). The forward chamber 134 is positioned forward of the first chamber 130. The forward chamber 134 is separated from the first chamber 130 by a generally vertical seam 137 (e.g., a sewn seam, a glued seam, or a combination thereof). While the first chamber 130 of the cushion 122 is generally planar (e.g., orthogonal to the cross-car direction), the forward chamber 134 is rotated or angled from this plane about the seam 137 in a direction toward the occupant, as shown schematically in FIG. 7. The first chamber 130 and forward chamber 134 create a concave pocket or shelf that receives and wraps around the occupant to provide additional restraint. The forward movement of an occupant is restrained by the airbag cushion 122 as the occupant's shoulder and torso are received in the pocket formed between the first chamber 130 and the forward chamber 134.

By creating a pocket for the shoulder, the cushion 122 can rotate into a position that is further around and further in front of the occupant than a generally planar cushion that would only rest up against the shoulder or most lateral part of the occupant. The airbag cushion 122 therefore provides restraint in both the lateral direction as well as the fore-aft direction and is able to "catch" or restrain the forward movement of the occupant and prevent the occupant from sliding off the airbag cushion 122 in an impact having both lateral and fore-aft components (e.g., an oblique impact). The first chamber 130 and the forward chamber 134 provide the airbag cushion 22 with a bi-directional restraint capability to restrain the occupant in cases where there is a standard side or frontal impact, but also provide further restraint in cases where the primary direction of force is not perpendicular to the side or front of the vehicle.

The forward chamber 134 may be rotated into position by an external strap or tether 138. In one embodiment, the tether 138 is routed through slits or openings in the fabric panels of the cushion 122 and is disposed on both the inboard side and the outboard side of the cushion 122. In another embodiment, the tether 138 may be provided only on one side (e.g., coupled on the occupant side between the fore and aft edges). In still other embodiments, the cushion 122 may not include a tether and the forward chamber 134 may be positioned in the rotated position by the geometry of the cushion 122.

In other embodiments, the forward chamber 134 may be configured in different shapes. For example, the cushion 122 may include a pivoting chamber in the form of a "ball" or sphere positioned in front of the shoulder or a pivoting chamber in the form of a generally vertical or slightly angled chamber that could provide support over a larger portion of the torso. In either primary impact direction (front or lateral), if the airbag cushion 122 is positioned with at least a portion of the cushion 122 adjacent a reaction surface (e.g., center console, door trim, etc.), the resulting pivoting chamber translates a portion of the reaction force toward the occupant in a direction to limit forward or lateral movement of the occupant.

Figure 8A:
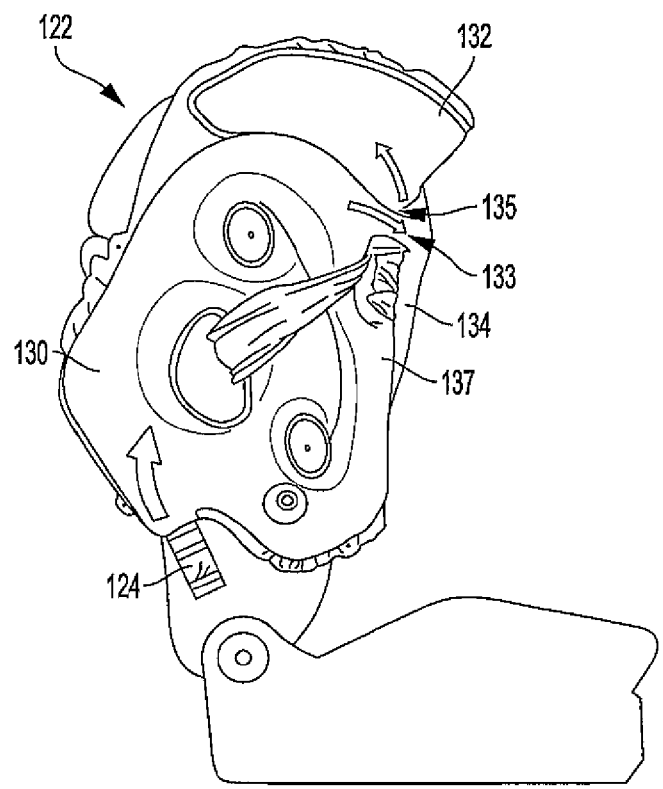
FIG. 8A is a side view of a vehicle seat with the airbag cushion of FIG. 4 in a second stage of inflation.
Figure 8B:
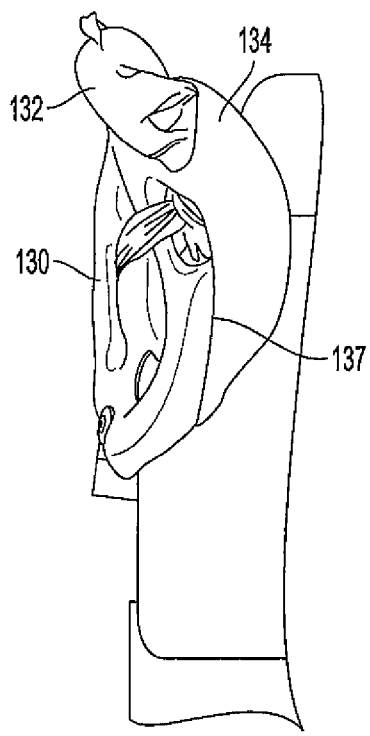
FIG. 8B is a top view of a vehicle seat with the airbag cushion of FIG. 4 in a second stage of inflation.

As shown in FIGS. 8A and 8B, the inflation gasses pass from the forward chamber 134 through the passage 135 to inflate the second chamber 132 later in the impact event (e.g., approximately 50-90 ms after ignition of the inflator 124). The second chamber 132 is positioned to be contacted by the head of the occupant. The second chamber 132 is configured to have a relatively high loft (e.g., large thickness and a lower pressure than the first chamber 130) to provide improved head cushioning when the head contacts the airbag cushion 122 during the impact event, reducing occupant head rebound and reducing the possibility of head or brain injury.

In some embodiments, the second chamber 132 may be rotated or angled from the plane of the first chamber 130 about a seam in a direction toward the occupant. As a result, the second chamber 132 may function similar to the angled forward chamber 134 to catch or contact the head earlier in an event to provide lateral head restraint. In addition, the angled second chamber 132 may also provide greater head restraint in the case of a non-perpendicular impact. The second chamber 132 may be angled toward the occupant by the geometry of the cushion 122 or by an external tether. Thus, the airbag cushion may be configured to include more than one tether to provide for effective deployment and positioning of the chambers 130, 132, 134.

Figure 9A:
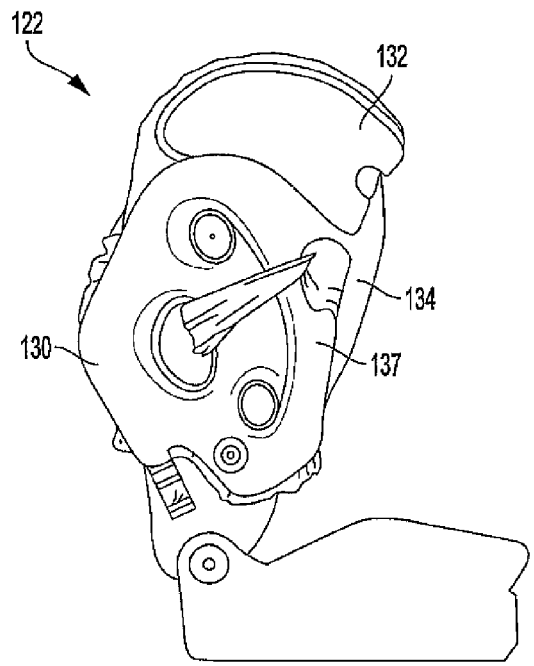
FIG. 9A is a side view of a vehicle seat with the airbag cushion of FIG. 4 fully inflated.
Figure 9B:
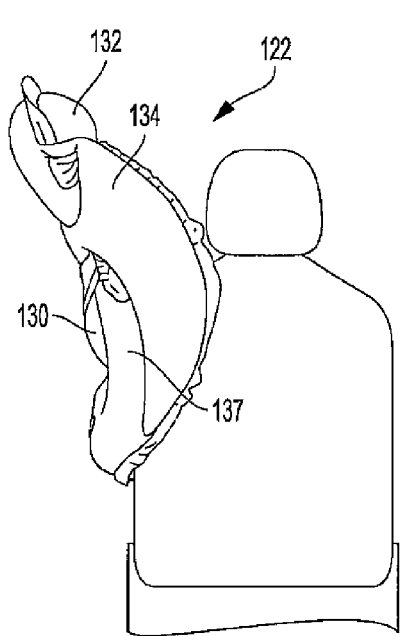
FIG. 9B is a front view of a vehicle seat with the airbag cushion of FIG. 4 fully inflated.
Figure 9C:
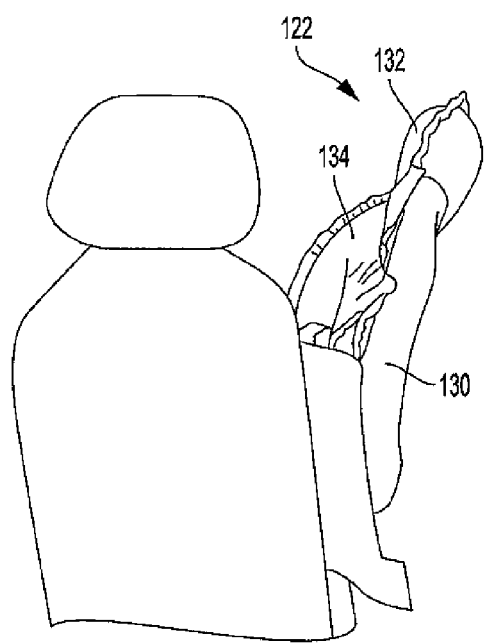
FIG. 9C is a rear view of a vehicle seat with the airbag cushion of FIG. 4 fully inflated.

Referring to FIGS. 9A-9C, the airbag cushion 122 is shown in a fully inflated state. By separating the volume of the cushion 122 into separate regions that have a staged deployment, higher initial pressures of the first chamber 130 may be able to be achieved with an inflator 124 having a lower output than would be required to provide this level of pressurization if the entire cushion 122 were required to be filled when lateral restraint is required (e.g., within 40 ms of a far side impact). By creating a cushion 122 with a first chamber 130 of smaller volume, the first chamber 130 can be deploy and positioned quickly, avoiding obstacles such as other occupants that can get in the path of deployment of a larger, slower developing cushion. With the staged deployment and chambering concept, the cushion 122 may have two or three effective working pressure stages to manage occupant restraint at different times of the event. In addition, the smaller volume of the first chamber 130 may also allow for a higher pressure at the earlier stage of deployment that can provide increased lateral restraint. As the deployment develops, and the second chamber 132 and the forward chamber 134 are filled, the pressure in the chambers 130, 132, and 134 decrease to a lower pressure that can provide improved cushioning and less rebound of the head.

Figure 10:
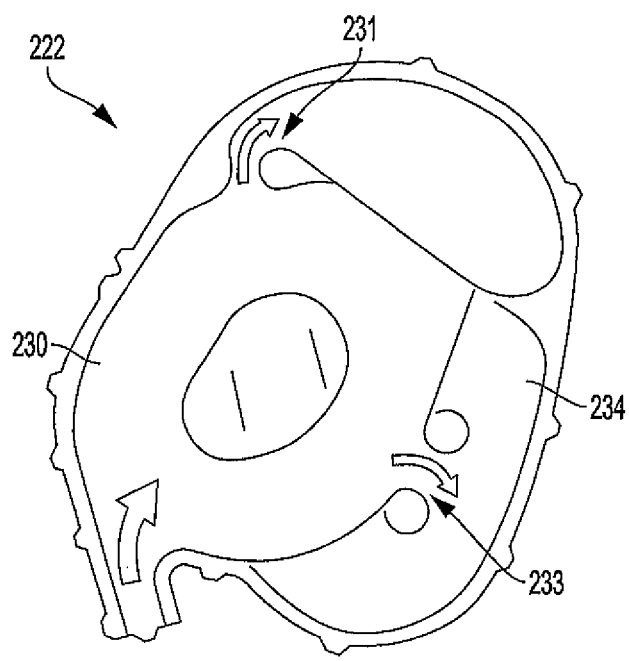
FIG. 10 is a front view of an airbag cushion of an airbag module in a flattened, uninflated configuration, according to another exemplary embodiment.
Figure 11:
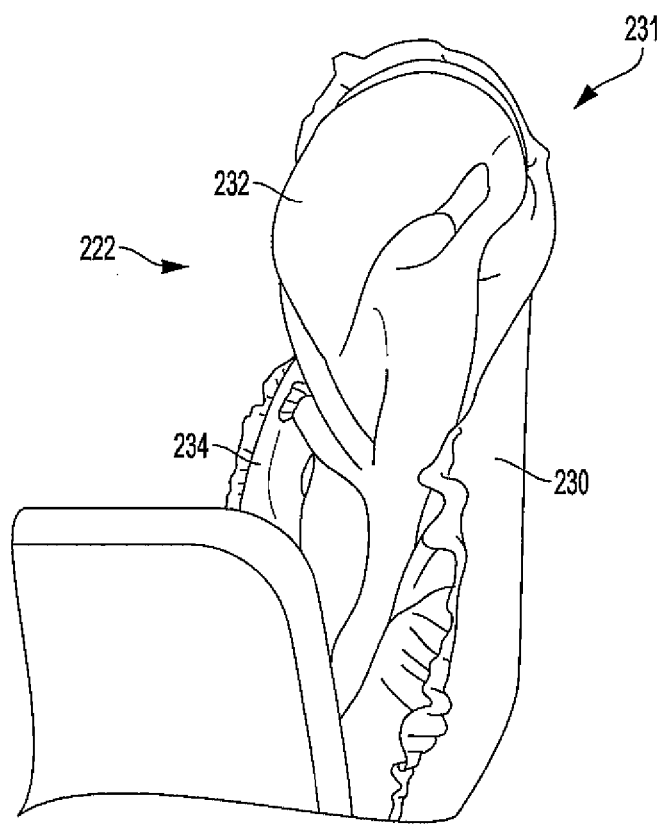
FIG. 11 is a rear view of a vehicle seat with the airbag cushion of FIG. 10 fully inflated.

Referring now to FIGS. 10-11, an airbag cushion 222 is shown according to another exemplary embodiment. The airbag cushion 222 includes a first or main chamber 230, a second chamber 232 disposed generally above the first chamber 230, and a third or forward chamber 234 disposed generally forward of the first chamber 230. Instead of being provided in series with the first chamber 230 and the second chamber 232, the third or forward chamber 234 may not be in direct fluid communication with the second chamber 232. Instead, the inflation of the second chamber 232 and the forward chamber 234 may be controlled independently via separate orifices. The second chamber 232 is in direct fluid communication with the first chamber 230 via a passage 231 and the forward chamber 234 is in direct fluid communication with the first chamber via a passage 233. The passages 231 and 233 may be configured such that the second chamber 232 and the forward chamber 234 inflate at different rates. For example, the passage 231 may be narrower and/or more torturous than the passage 233 such that the forward chamber 234 inflates earlier and/or faster than the second chamber 232. The airbag cushion may be configured to include more than one tether to provide for effective deployment and positioning of the chambers 230, 232, 234.

According to another exemplary embodiment, a side impact airbag cushion may be disposed between an occupant of the vehicle and the door (e.g., mounted to the outboard side of the vehicle seat or to the door panel). The airbag cushion includes a main chamber and a forward chamber disposed generally forward of the main chamber and in fluid communication with the main chamber. The main chamber of the cushion is generally planar (e.g., orthogonal to the cross-car direction) and the forward chamber is rotated or angled from this plane in a direction toward the occupant. The forward chamber creates a concave pocket or shelf to further wrap around the occupant and provide additional restraint. The forward movement of an occupant impacting the main chamber is restrained by the airbag cushion as the occupant's shoulder and torso are received in the pocket formed between the main chamber and the forward chamber.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" and "embodiment" are used herein to describe various embodiments. These embodiments are possible examples, representations, and/or illustrations of embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft," "inboard," "outboard," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for protecting an occupant of a vehicle seat comprising:
    an inflatable cushion;
    an inflator for providing inflation gas for the cushion;
    wherein the cushion is configured to inflate into a position inboard of the vehicle seat and includes a first inflatable chamber fluidly connected to a second inflatable chamber;
    wherein the cushion is configured to inflate into a position in which the first inflatable chamber is in a position to absorb energy resulting from relative movement of the torso of the occupant in a direction lateral to the longitudinal axis of the vehicle, and wherein the second inflatable chamber is configured to inflate into a position to absorb energy resulting from relative movement of the head of the occupant;
    wherein the inflatable cushion is configured so that the first inflatable chamber fully inflates prior to the second inflatable chamber becoming fully inflated;
    wherein the pressure of the fully inflated first inflatable chamber is greater than the pressure of the fully inflated second inflatable chamber, and wherein the pressure of the fully inflated first inflatable chamber is greater than 100 kPa.

2. The module of claim 1, wherein the inflatable cushion is configured so that inflation gas can only enter the second inflatable chamber after passing through the first inflatable chamber.

3. The module of claim 2, wherein the first and second inflatable chambers are fluidly connected by a passage that restricts the flow of inflation gas into the second inflatable chamber.

4. The module of claim 1, wherein the cushion is configured so that the first chamber is fully inflated at least 25 ms after the inflator is initiated.

5. The module of claim 1, wherein the cushion remains inflated for at least 70 ms.

6. The module of claim 5, wherein the cushion remains inflated for at least 160 MS.

7. The module of claim 1, wherein at a point in time after the first inflatable chamber and the second inflatable chamber are fully inflated, the pressure in the first inflatable chamber and the second inflatable chamber equalizes.

8. The module of claim 7, wherein the pressure in the first and second inflatable chambers equalizes at least 60 ms after the inflator is initiated.

9. The airbag module of claim 1, wherein a loft of the second inflatable chamber is greater than a loft of the first inflatable chamber.

10. The module of claim 9, wherein the inflatable cushion is configured so that inflation gas can only enter the second inflatable chamber after passing through the first inflatable chamber.

11. The module of claim 9, wherein the inflatable cushion is configured to remain inflated for at least 120 ms.

12. An airbag module for protecting an occupant of a vehicle seat comprising:
- an inflatable cushion;
- an inflator for providing inflation gas for the cushion;
- wherein the cushion is configured to inflate into a position inboard of the vehicle seat and includes a first inflatable chamber fluidly connected to a second inflatable chamber;
- wherein the cushion is configured to inflate into a position in which the first inflatable chamber is in a position to absorb energy resulting from relative movement of the torso of the occupant in a direction lateral to the longitudinal axis of the vehicle, and wherein the second inflatable chamber is configured to inflate into a position to absorb energy resulting from relative movement of the head of the occupant;
- wherein the inflatable cushion is configured so that the first inflatable chamber fully inflates prior to the second inflatable chamber becoming fully inflated;
- wherein the airbag is configured so that when the second chamber is fully inflated, the pressure in the second chamber is less than half of the pressure of the first chamber.

13. An airbag apparatus for protecting an occupant of a seat of a vehicle, the apparatus being configured to be mounted in a position so that an airbag will deploy in a position between seats of a vehicle, comprising:
- an inflator for supplying gas to the airbag;
- the airbag including a first chamber and a second chamber;
- wherein the first chamber of the airbag fully inflates prior the second chamber of the airbag and the airbag deploys into a position in which the first chamber provides lateral restraint to restrict lateral movement of the occupant relative to the longitudinal direction of the vehicle;
- wherein the second chamber of the airbag inflates to a lower pressure than the first chamber of the airbag and provides protection for the head of the occupant
- wherein the pressure in the first chamber is at least 100 kPa.

14. The airbag apparatus of claim 13, wherein the first chamber of the airbag provides lateral restraint to the torso of the occupant.

15. The airbag apparatus of claim 14, wherein the airbag is configured so that the pressure in the first and second chambers equalizes after the airbag is fully inflated and at least 60 ms after the inflator begins supplying gas into the airbag.

* * * * *